United States Patent [19]

Benson

[11] 4,240,682
[45] Dec. 23, 1980

[54] BEARING RACE
[75] Inventor: Carl F. Benson, Torrington, Conn.
[73] Assignee: The Torrington Company, Torrington, Conn.
[21] Appl. No.: 20,754
[22] Filed: Mar. 15, 1979
[51] Int. Cl.³ .................. F16C 33/58; F16C 19/24
[52] U.S. Cl. .................. 308/216; 308/237 R; 308/241
[58] Field of Search .................. 308/216, 237 R, 241
[56] References Cited

U.S. PATENT DOCUMENTS

| 1,577,480 | 3/1926 | McKamey | 308/216 |
| 1,675,728 | 7/1928 | Pierce, Jr. | 308/216 |
| 2,624,645 | 1/1953 | Virtue | 308/216 |
| 2,648,578 | 8/1953 | Stearns et al. | 308/216 |
| 3,275,389 | 9/1966 | Neilson et al. | 308/241 |
| 3,677,032 | 7/1972 | Suzuki | 308/237 |

FOREIGN PATENT DOCUMENTS

| 2723928 | 3/1978 | Fed. Rep. of Germany | 308/241 |
| 1441768 | 7/1976 | United Kingdom | 308/237 R |

Primary Examiner—Richard R. Stearns
Attorney, Agent, or Firm—Frank S. Troidl

[57] ABSTRACT

At least one groove extends longitudinally across the race. The race includes a relatively soft metal core with its inner and outer surfaces being carburized. The sides of the groove are also carburized and a carburized portion extends radially from the bottom of the groove entirely across the race.

5 Claims, 2 Drawing Figures

BEARING RACE

This invention relates to bearings. More particularly, this invention is an improved bearing race constructed to be easily fractured.

Hardened split raceways for roller bearings are widely used in industry for application in separable journals in internal combustion engines and other capped journals in which the structural material may be soft steel, cast iron or aluminum unsuitable to serve as the outer raceway for the bearing rollers. A requirement of such a split raceway is that the two semi-circular halves must fit together as nearly perfectly as possible to avoid any sharp aberrations in the internal surface which would impair the smooth rolling of the rollers over the joint area. Mismatches will result in both high stress points and noisy operation.

Well known methods of accomplishing a suitable match are to grind very precise complementing chevron or saw tooth forms on the ends of the halves, or to finish grind the bore and outside diameter of a fully hardened raceway and by proper placement of stress-concentrating grooves or scratches, to fracture the ring into two halves, the irregular pattern of the fracture providing an excellent key to re-register the two parts. This method is used both with a relatively straight fracture parallel to the axis of the bore and with fractures modified by stress risers to approach the chevron shape to provide a more positive axial positioning key.

These practices have certain disadvantages. Grinding of the keys requires very precise fixturing and tolerancing and the two halves must be made separately. In some cases, a fully finished and heat-treated ring is made and cut apart to make a single half race, with the other half being lost as scrap. This method is obviously an expensive procedure. Fracturing of the races is more economical but conventionally, these races have been made of fully hardened steels in order that the rings be brittle enough to fracture without distortion in the fracture area. These thicker races are often finished at the maximum hardness obtainable and tempered to a proper ductility after fracturing. A high percentage of unusable parts often results from erratic fracture propagation, secondary fractures, and chipping. A further disadvantage is that since the stress risers used with thru-hardening steel are conventionally quite shallow in depth compared with the section thickness of the race ring, considerable force must be applied to produce the fracture and rigid properly designed fixturing is required. This requires that the fracturing be done by the bearing manufacturer and since no two fractures are identical, it requires that the two specific halves from one ring be kept together and identified as a pair during shipment and assembly by the user. This is often done by adding a snap ring groove and retainer ring in the outside diameter of the race at yet more expense.

All of these difficulties are avoided by the present invention. Briefly described, the invention is a bearing race comprising an annular metal member having at least one groove extending from one longitudinal end to the other longitudinal end of the annular metal member. The annular metal member has a relatively soft metal core and a first carburized portion extending inwardly from the outer surface. A second carburized portion extends outwardly from the inner surface. These two carburized portions are substantially the same in thickness. Carburized portions also extend from the sides of the groove. A carburized portion also extends radially from the bottom of the groove entirely across the annular metal member.

The race may be either an outer race or an inner race. The fully carburized zone radially extending from the bottom of the groove entirely across the annular metal member is preferably a maximum of twice the thickness of the carburized portion extending inwardly from the outer surface of the metal annular member. Preferable, the fully carburized portion from the bottom of the groove has a maximum thickness of 0.024 inches.

The invention, as well as its many advantages, may be further understood by reference to the following detailed description and drawings in which.

Figure 1:
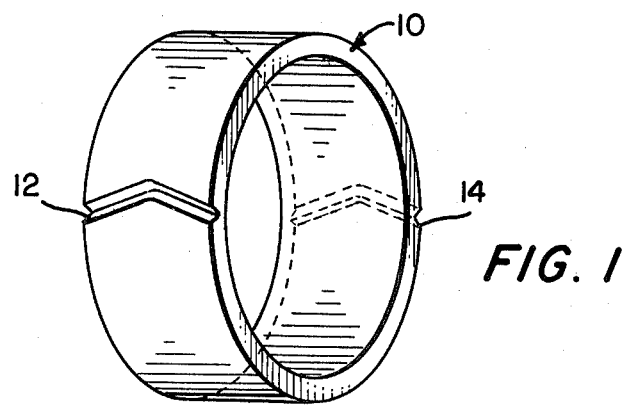
FIG. 1 is a general view of a typical outer race.

Referring to the drawings, and more particularly to FIG. 1, the invention includes an annular metal member 10. At least one groove extends from one longitudinal end of the annular metal member 10 to the other longitudinal end of the annular metal member 10. In the preferred embodiment of FIG. 1, two diametrically spaced grooves 12 and 14 are provided in the annular member 10. Each groove 12 and 14 extends from one longitudinal end of the annular metal member 10 to the other longitudinal end of the annular metal member.

In FIG. 1, the grooves are shown as chevron shaped but may be any other irregular shape that will provide axial positioning after fracture. The grooves 12 and 14 are relatively deep narrow fracture grooves. Also, in FIG. 1, the race 10 is shown as a straight cylinder but may be modified by either outwardly or inwardly extending flanges, partial flanges, tabs, or other features as long as they are removed or relieved at the ends of the fracture grooves so that the grooves may extend to the edges of the cylinder portion itself.

Figure 2:
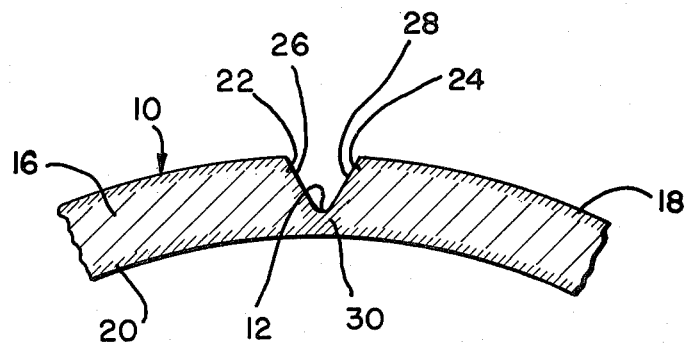
FIG. 2 shows on an enlarged scale, a typical section through a portion of the race of FIG. 1 at a groove taken at right angles to the axis of the bore.

Referring more specifically to FIG. 2, the annular metal member 10 includes a relatively soft metal core 16. A first carburized portion 18 extends inwardly from the outer surface of the annular metal member 10. A second carburized portion 20 extends outwardly from the inner surface of the annular metal member 10. The thickness of carburized portion 20 is substantially the same as the thickness of carburized portion 18. Carburized portions 22 and 24 extend from the sides 26 and 28 respectively of the groove 12. Of course, though not shown, in FIG. 2, similar carburized portions extend from the sides of groove 14 of FIG. 1.

The carburized portion 30 extends radially from the bottom of the groove entirely through the annular metal member 10. The depths of the grooves 12 and 14 are proportioned such that the thickness remaining at the bottom is approximately twice the thickness of the carburized portion 18. This insures that the section at the bottom of the groove becomes fully through-hardened to permit easy and distortion-free fracturing. A typical race may be 0.040 inches thick with a required effective carburized portion 18 or 20 of a thickness of 0.012 inches to 0.016 inches. The thickness of carburized portion 30 extending from the bottom of the groove through the annular metal member should then be no more than approximately 0.024 inches and preferably will be thinner.

It is preferable that this area be as thin as practicable for the bearing application rather than the maximum dictated by the depth of case in order to provide another valuable advantage. This advantage is to fracture only one of the grooves in the manufacturer's plant, ship the parts to the user and let the assembler fracture the other side at assembly. Depending on the diameter of the race and the thickness of the section, the groove depth may be adjusted so that the assembler may fracture the remaining side in many cases simply by levering lightly by hand or by giving the ring a light, sharp blow against a hard object. In other cases, he might need a very simple hand tool to accomplish the separation. This will eliminate costly provisions for keeping specific halves together in shipping and handling or identified such that they may be re-assembled as a pair at assembly. It will also eliminate the inevitable occasional accidental mismatches from misreading identification markings. In the case of snap ring assemblies, it eliminates the necessity of removing the ring at assembly. Mismatches obviously are to be avoided. They result in expensive tear-downs by the manufacturer of the equipment in which they are used if detected in the inspection and test procedures; worse, if undetected, they lead to serious and potentially hazardous field failures in use.

I claim:

1. A bearing race comprising: an annular metal member having at least one groove extending from one longitudinal end of the annular metal member to the other longitudinal end of the annular metal member, said annular metal member having a relatively soft metal core with a first carburized portion extending inwardly from the outer surface of the metal annular member, a second carburized portion extending outwardly from the inner surface of the annular metal member substantially the same thickness as the first carburized portion, carburized portions extending from the sides of said groove and a carburized portion extending radially from the bottom of said groove entirely through the annular metal member, said carburized portion of the annular metal member radially extending from the bottom of the groove entirely through the annular metal member being a maximum of twice the thickness of said first carburized portion.

2. A bearing race in accordance with claim 1 wherein: the carburized portion radially extending from the bottom of the groove entirely through the annular metal member has a maximum thickness of 0.024 inches.

3. A bearing race in accordance with claim 2 wherein: there are two diametrically spaced grooves each groove extending from one longitudinal end of the annular metal member to the other longitudinal end of the annular metal member; and a carburized portion radially extends from the bottom of each groove.

4. A bearing race comprising: an annular metal member having at least one longitudinally extending groove, said annular metal member having a relatively soft metal core with a first carburized portion extending inwardly from the outer surface of the metal annular member, a second carburized portion extending outwardly from the inner surface of the annular metal member substantially the same thickness as the first carburized portion, carburized portions extending from the sides of said groove, and a carburized portion extending radially from the bottom of said groove entirely through the annular metal member having a maximum thickness twice the thickness of said first carburized portion.

5. A bearing race in accordance with claim 4 wherein the carburized portion extending radially from the bottom of said groove entirely through the annular metal member has a maximum thickness of 0.024 inches.

* * * * *